(12) United States Patent
Backlund et al.

(10) Patent No.: US 7,984,455 B2
(45) Date of Patent: Jul. 19, 2011

(54) ENHANCED NATIVE CONTACT BOOK APPLICATION

(75) Inventors: Erik Johan Vendel Backlund, Gantofta (SE); Mans Folke Markus Andreasson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 970 days.

(21) Appl. No.: 11/770,828

(22) Filed: Jun. 29, 2007

(65) Prior Publication Data

US 2008/0301718 A1  Dec. 4, 2008

Related U.S. Application Data

(60) Provisional application No. 60/940,748, filed on May 30, 2007.

(51) Int. Cl.
*G06F 9/44* (2006.01)
(52) U.S. Cl. ......................... 719/328; 719/329
(58) Field of Classification Search .................. 719/310, 719/328, 329; 709/217, 218, 250; 455/418, 455/466
See application file for complete search history.

(56) References Cited

U.S. PATENT DOCUMENTS

| | | | | |
|---|---|---|---|---|
| 6,173,316 B1 * | 1/2001 | De Boor et al. | ............... | 709/218 |
| 6,317,781 B1 * | 11/2001 | De Boor et al. | ............... | 709/217 |
| 6,915,138 B2 * | 7/2005 | Kraft | ............................. | 455/466 |
| 6,970,697 B2 * | 11/2005 | Kouznetsov et al. | ......... | 455/418 |
| 6,987,963 B2 * | 1/2006 | Kouznetsov et al. | ...... | 455/414.1 |
| 7,191,239 B2 * | 3/2007 | Rozenfeld et al. | ............ | 709/229 |
| 7,228,340 B2 * | 6/2007 | De Boor et al. | ............... | 709/217 |
| 7,328,031 B2 * | 2/2008 | Kraft | ............................. | 455/466 |
| 7,340,244 B1 * | 3/2008 | Osborne et al. | ............ | 455/414.1 |
| 7,761,606 B2 * | 7/2010 | Sunder et al. | ................. | 709/250 |
| 7,884,824 B2 * | 2/2011 | Reponen | ...................... | 345/440 |
| 2003/0018832 A1 | 1/2003 | Amirisetty et al. | | |
| 2004/0207508 A1 * | 10/2004 | Lin et al. | ......................... | 340/5.1 |
| 2005/0010584 A1 * | 1/2005 | Reponen | ...................... | 707/100 |
| 2005/0138116 A1 * | 6/2005 | Bjare et al. | .................... | 709/203 |
| 2006/0160529 A1 * | 7/2006 | Glass | ............................ | 455/418 |
| 2007/0050510 A1 * | 3/2007 | Jiang | ............................ | 709/227 |

FOREIGN PATENT DOCUMENTS

JP  2005-020583  1/2005

OTHER PUBLICATIONS

Nokia, "Mobile Service Architecture Specification", Version 1.00, pp. 1-116, Sep. 27, 2006.*
International Search Report and Written Opinion for corresponding Application No. PCT/IB2007/003718 dated Jun. 3, 2008.
Anonymous; "JSRs: Java Specification requests JSR 211: Content Handler API"; Internet Article, XP002478953; URL: http://jcp.org/en/jsr/detail?id-211> Apr. 2008.
International Preliminary Report on Patentability for corresponding Application No. PCT/IB2007/003718 dated Sep. 8, 2009.

* cited by examiner

*Primary Examiner* — Van H Nguyen
(74) *Attorney, Agent, or Firm* — Renner, Otto, Boisselle & Sklar, LLP

(57) ABSTRACT

An electronic device that includes a native contact book application, at least one Java application for providing one or more functions relating to information included in the native contact book application, and a content handler serving as an interface between operations of the native contact book application and operations of the at least one Java application.

6 Claims, 6 Drawing Sheets

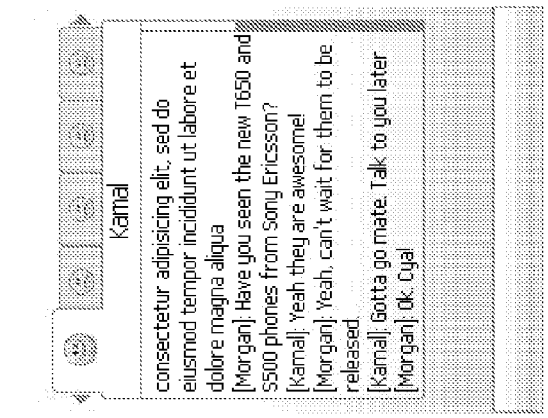
FIG. 7D
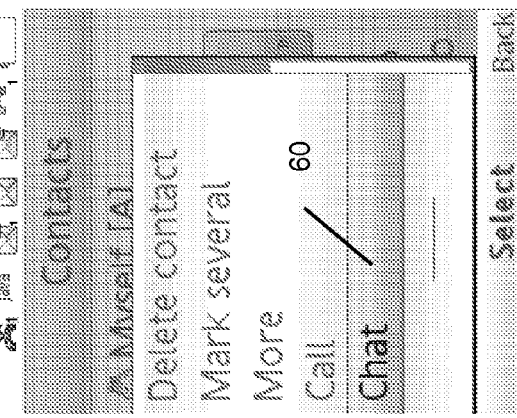
FIG. 7C
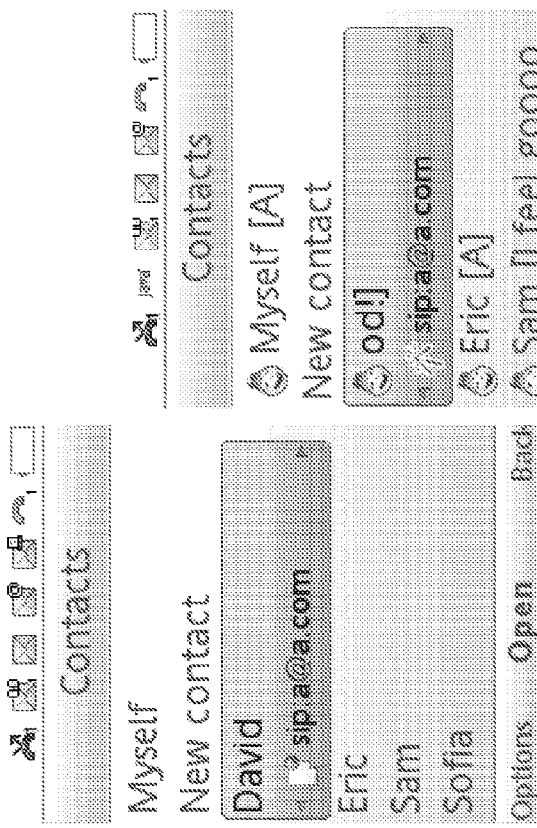
FIG. 7B
FIG. 7A

ENHANCED NATIVE CONTACT BOOK APPLICATION

CROSS REFERENCE TO RELATED APPLICATION

This application claims priority under 35 U.S.C. §119 to U.S. Provisional Application No. 60/940,748, filed May 30, 2007, the entire disclosure of which is incorporated herein by reference.

TECHNICAL FIELD OF THE INVENTION

The present invention relates generally to electronic devices, and more particularly to an electronic device having an enhanced native contact book application.

DESCRIPTION OF THE RELATED ART

Electronic devices such as mobile phones, personal organizers, etc., typically include a native contact book application. The contact book application is native in the sense that it comes as a built-in or standard feature of the electronic device operating system. The contact book gives the user an easy way to gather and organize contact information including the names, addresses, phone numbers, email addresses, notes, etc. of various "contacts" (e.g., personal friends, associates, business clients, etc.).

Today, it is difficult for a Java application running in such electronic devices to communicate to the native contact book application. In particular, it is difficult for the Java application to add information and/or actions in relation to the contacts.

In view of the aforementioned shortcomings, there is a strong need in the art for an electronic device architecture which enables a Java application to communicate to the native contact book application in a simple, straightforward manner.

SUMMARY

According to an aspect of the invention, an electronic device is provided that includes a native contact book application, at least one Java application for providing one or more functions relating to information included in the native contact book application, and a content handler serving as an interface between operations of the native contact book application and operations of the at least one Java application.

According to another aspect, the content handler is a JSR-211 content handler.

In accordance with another aspect, the at least one Java application provides additional user interface information relating to corresponding contacts included in the native contact book application to the native contact book application via the content handler.

According to another aspect, the additional user interface information comprises presence information.

According to still another aspect, the at least one Java application provides at least one command relating to contact information included in the native contact book application to the native contact book application via the content handler.

According to yet another aspect, the at least one command calls a function carried out by the at least one Java application.

In accordance with another aspect, the at least one command serves to initiate a chat session with a contact identified in the native contact book application.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

FIGS. 7A-7D illustrate exemplary display sequences in accordance with the exemplary embodiments of the present invention.

DETAILED DESCRIPTION OF EMBODIMENTS

Figure 1:
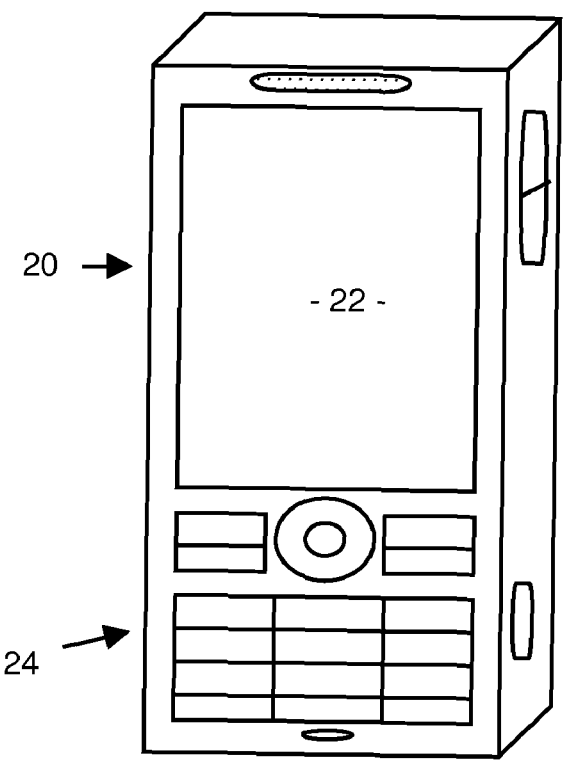
FIG. 1 is a perspective view of an electronic device in accordance with an exemplary embodiment of the present invention.

The present invention will now be described with reference to the drawings, wherein like reference numerals are used to refer to like elements throughout.

Referring initially to FIG. 1, and electronic device 20 is shown in accordance with an exemplary embodiment of the present invention. The electronic device 20 as described herein is a mobile phone 20, although it will be appreciated that the electronic device 20 may be any other type of electronic device 20 without departing from the scope of the invention.

The mobile phone 20 includes a display 22 for displaying menus, operational information, input data, etc. in relation to the use and operation of the mobile phone 20. The keypad 24 includes a plurality of input keys including alphanumeric keys, function keys, cursor control, etc., as is conventional. As is discussed below in more detail, the mobile phone 20 includes therein a Java content handler (JSR-211) which, when used in accordance with the present invention, enables a Java application to communicate to the native contact book application within the mobile phone 20 in a simple, straightforward manner. By using the JSR-211 content handler application program interface (API), a Java MIDlet can interact with the native contact book application user interface, create commands for various application functions (e.g., softkeys which, when selected, call various application functions), and extend the contact information that is shown for a contact.

In accordance with the invention, by opening up the native contact book application within the mobile phone 20 or other electronic device, a Java application can provide additional function commands, not found in the native contact book application, on contacts and on addresses of the contact, for example. Such additional commands may be in the form of softkeys, for example, which when selected initiate a chat session within the Java application. Alternatively, such additional commands may be any other type of commands for initiating a function not otherwise included in the native contact book application. In addition, or in the alternative, the Java application can add user interface (UI) information into a contact item, e.g. presence information from the Java application etc.

In the embodiments described herein, the Java applications running within the mobile phone 20 utilize the JSR-211 content handler API (also known as CHAPI). As is known, the JSR-211 model is based on the concept of content handlers. Using this execution model, a given MIDlet can register itself into a device's operating system to become the default application responsible for manipulating files of a specific MIME type. For example, one might create a MIDlet to edit/display .png images and register it as the default handler for the image/png MIME type. From successful registration onward, any requests for visualization of a .png file would then automatically activate the MIDlet (regardless of whether that request was initiated by a Java application or an application written in some other language). For example, if the user receives an SMS message with a link to a .png file and then selects the link, the registered Java MIDlet would activate and handle the request.

The CHAPI implementation fits on the known Java J2ME architecture. The invocation of registered content handlers is based on URIs; the MIDlet that invokes a content handler doesn't need to specify the application that should be used. The MIDlet needs to supply only the content's URI (in a manner similar to the platformRequest method on the MIDlet class), the operation to be executed (editing, saving, creating, etc), and any other parameters that may be needed for execution.

It is possible to register more than one content handler for any specific file type. In such case, the invoking application can specify which application to use to handle the content by specifying its ID. The API also supports execution of chained (sequential) content handlers, which allow more than one application to process the content in sequence, each one handing execution to the next application in the chain. In that case, the first content handler registered for the given type is always the first one executed.

In the case of adding UI information, such as presence information, a Java application running within the mobile phone 20 registers into the registry of the JSR-211 content handler to handle contacts and to execute actions on addresses, phone numbers, session initiation protocol (sip) addresses, etc., in association with contacts within the native contact book application within the mobile phone 20. The user subsequently enters the native contact book application. The native contact book application starts and starts to read contacts from the persistent storage within the mobile phone 20. For each contact, the contact book application sends a request to the content handler with the unique contact identifier (id). The content handler checks if there is any registered Java application for the given contact type and, if there is, the request is rerouted to the Java application that is registered. The Java application receives the request, collects presence information for the contact and sends back a response to the contact book application. The contact book application receives the response and updates the contact item with the information that is sent back in the response object.

In the case of adding function commands such as softkeys for a contact, address of a contact, etc., again the java application registers into content handler registry to handle a specific contact type (e.g., contact, sip address, etc.). The user enters the contact book application. Again, the native contact book application starts and starts to read contacts from the persistent storage within the mobile device 20. The user may then highlight a contact or an address of a contact on the display 22 via the keypad 24, for example. The native contact book application calls content handler server to see if there is any server registered for this address type. If there is, the contact book application receives the softkey string or other function command from content handler and generates the commands (e.g., softkey(s)) on the display 24. The user selects a generated command from the display 24, and the native contact book application sends a request to the content handler server. The request is then rerouted to the registered Java application for that function or action. The Java application receives the request and handles the function or action.

Figure 2:
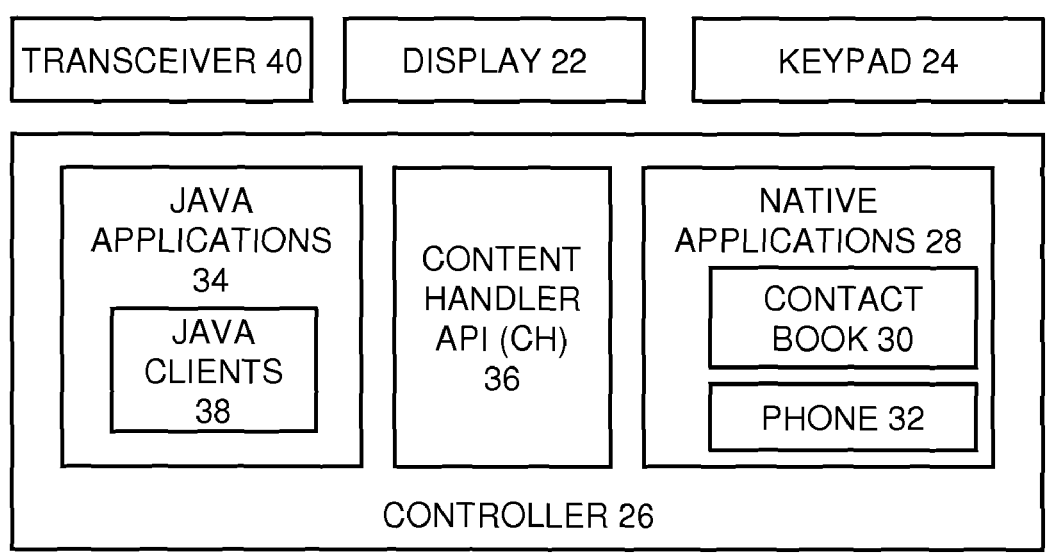
FIG. 2 is a diagram of the system architecture of the electronic device of FIG. 1 in accordance with an embodiment of the present invention.

Referring briefly to FIG. 2, an exemplary system architecture for the mobile phone 20 is shown. The mobile phone 20 includes a controller 26 for controlling overall operation of the mobile phone 20 as described herein. The controller 26 executes software and/or firmware included therein for carrying various applications 28 native to the mobile phone 20. Such applications include the aforementioned native contact book application 30, and further may include various other native applications including the overall phone application 32 for controlling phone operations.

The controller 26 further includes one or more Java applications 34, and the aforementioned JSR-211 CHAPI content handler 36. As described above, the Java applications 34 may include one or more applications, referred to herein as "Java clients" 38 for adding UI information and/or commands to the contacts within the native contact book application 30. The content handler 36, in accordance with the present invention, enables the Java applications 34 to communicate with and add functionality to the native contact book application 30 in a simple and straightforward manner. One having ordinary skill in the art of computer programming, and particularly programming in Java, will readily understand how to program the mobile phone 20 so as to operate as described herein. Consequently, detailed program code has been omitted for the sake of brevity.

As is conventional, the mobile phone 20 also includes a radio transceiver 40 for carrying out mobile communication, the aforementioned display 22, keypad 24 and other conventional hardware, software, etc.

Figure 3:
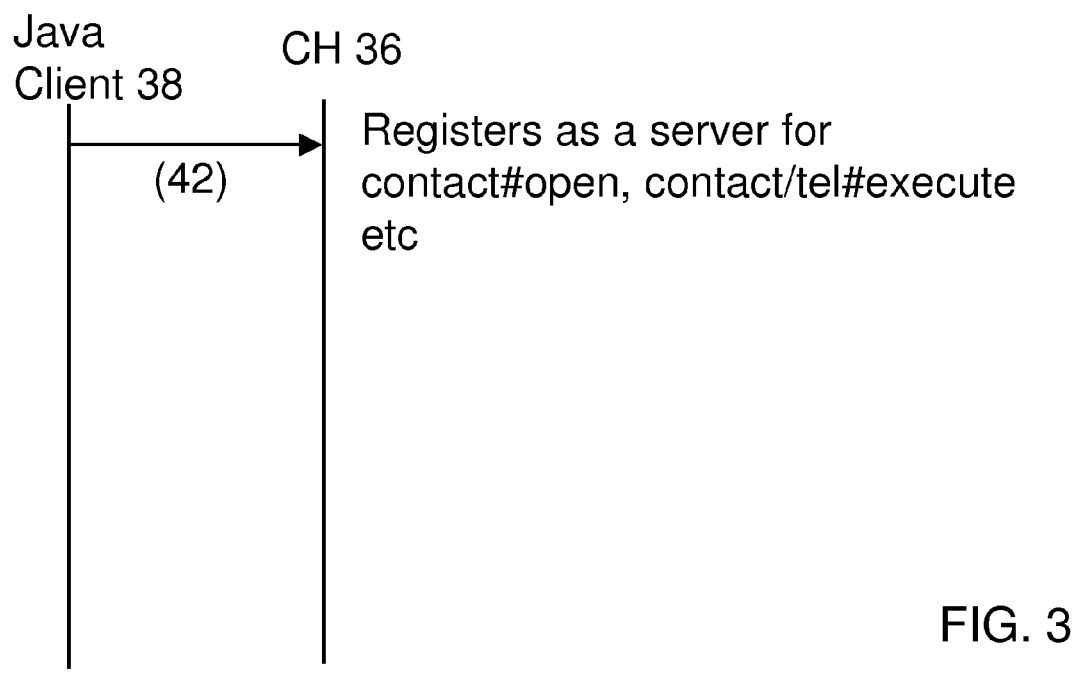
FIG. 3 illustrates a registration step in which the Java application registers to handle requests (e.g., during installation or runtime)
Figure 4:
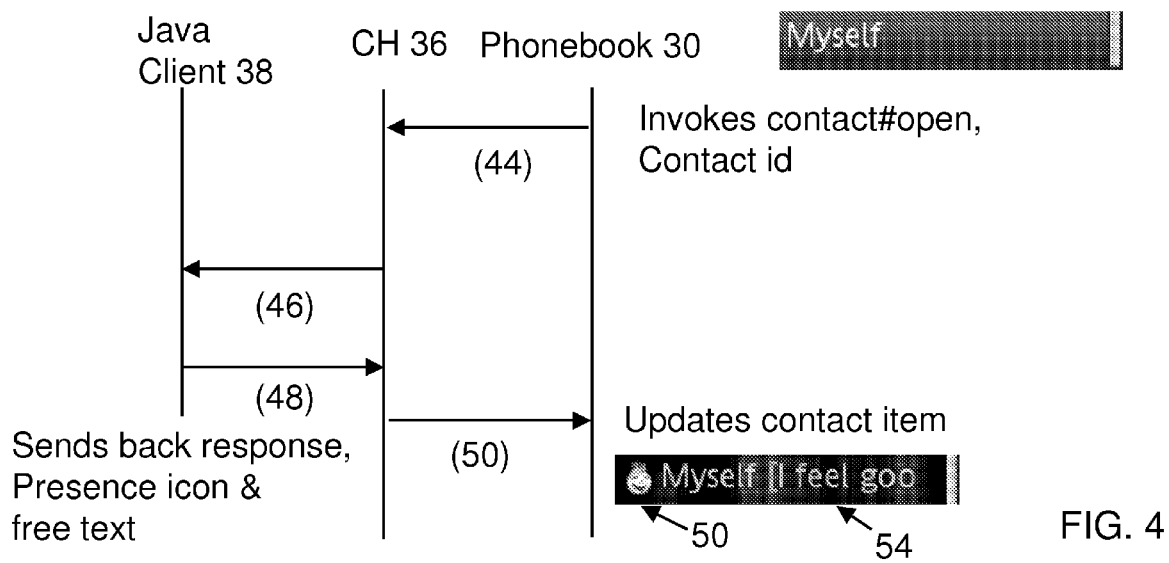
FIG. 4 illustrates an exemplary embodiment of the invention in which the Java application provides presence information in response to a request by the native contact book.

FIGS. 3 and 4 represent operation in accordance with the example of adding UI information using the present invention. As is shown in step 42 in FIG. 3, the Java client 38 for adding such information registers with the content handler 36 as a server. For example, such registration may occur during installation or runtime. The Java client 38 may identify itself to the content handler 36 as providing information for various objects such as contact names, telephone numbers, sip addresses, etc. In step 44, the user opens the native contact book application 32 (also referred to herein as the "phonebook") in the mobile phone 20. The user, by way of the keypad 24, may select a particular contact (e.g., "Myself") from the contact list within the application 32 as represented in FIG. 4. The native contact book application 30 in step 44 sends a request to the content handler 36 with a unique contact identifier identifying the selected contact. The content handler 36 checks whether there is any Java application or client 38 registered for the given type of contact selected (step 42 in FIG. 3).

If the content handler 36 determines a Java client 38 is registered, the content handler 36 reroutes the request from the native contact book application to the Java client 38 as represented in step 46. The Java client 38 receives the request from the content handler 36 and collects the presence information (e.g., whether a contact is online or offline) or other UI information associated with the particular contact. The presence or other UI information may be obtained by the Java client 38 in any conventional manner, whether via application data stored within the mobile phone 20 running as part of the Java application, or information which is gathered via a remote server (e.g., a network based chat server, network contact book, etc.) or the like. As will be appreciated, the Java client 38 may connect to an application server on the Internet or any other network via the transceiver 40 or the like.

The UI information gathered by the Java client 38 is in turn routed back to the native contact book application 30. More specifically, the Java client 38 sends a response to the request back to the content handler 36 as represented in step 48. The content handler 36 in turn reroutes the response to the native contact book application 30 as represented at step 50. The native contact book application 30 receives the information included in the response, updates the information included the contact book in associated with the selected contact, and displays the updated information. In the exemplary embodiment, the UI information as provided by the Java client 38 includes a presence icon indicating the presence of the selected contact, together with text 54 associated with the selected contact (e.g., "I feel good"). The mobile phone 20 in turn displays such updated information as represented in FIG. 4.

Figure 5:
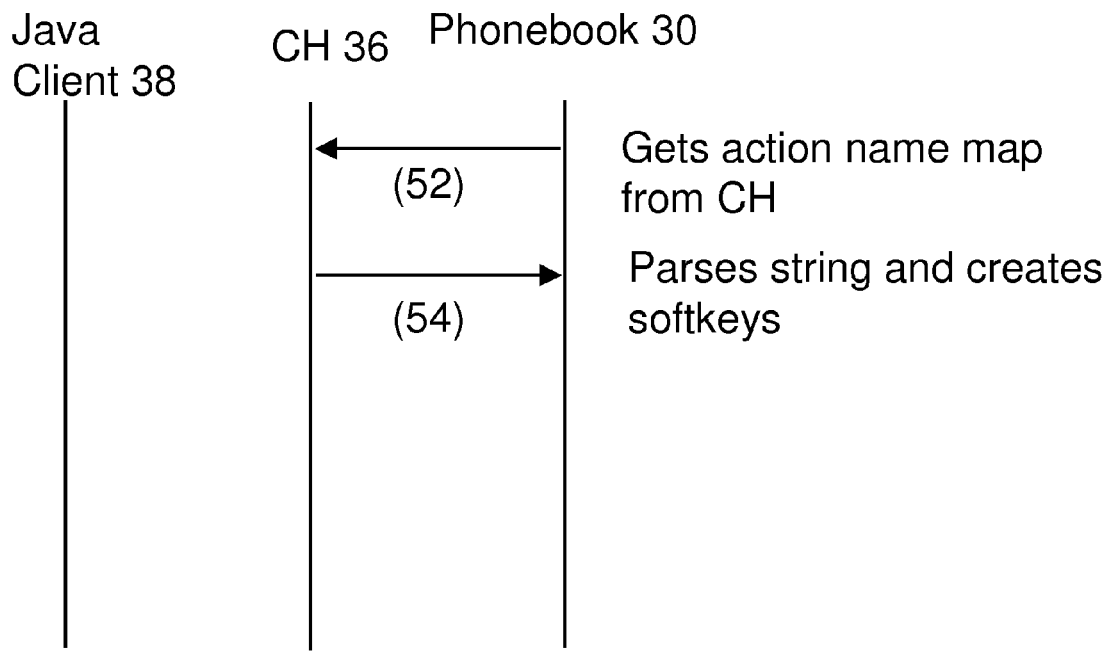
FIG. 5 and FIG. 6 illustrate an exemplary embodiment of the invention in which the Java application adds softkey strings to the native contact book representing respective commands, and implements the requested function.
Figure 6:
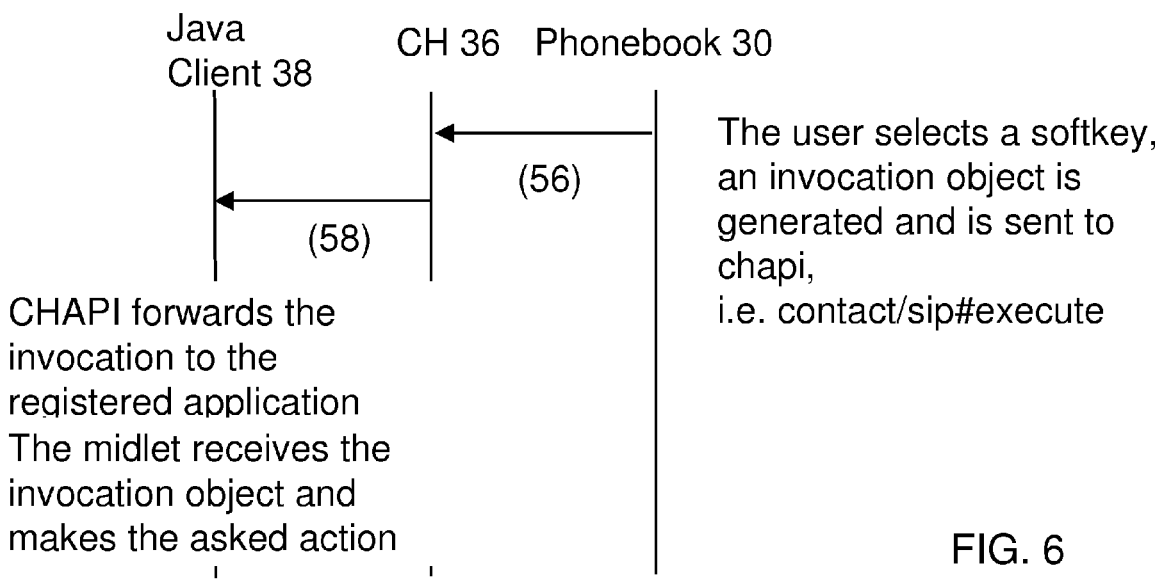

FIGS. 5 and 6 represent operation in accordance with the example of adding different commands using the present invention. For example, it may be desirable to add a softkey to a given contact to command the start of a chat session from the native contact book application 30. Initially, the Java client 38 for providing the desired functionality associated with such command(s) registers with the content handler 36 in a registration step similar to that shown in step 42 of FIG. 3. For example, the Java client 38 registers to handle contact/sip address chat session requests, and registers the softkey strings (action names) into the content handler 36.

When a user enters the native contact book application 30 and selects a given contact sip address, the native contact book application 30 in step 52 queries the content handler 36 whether there is a Java client 38 registered for the selected sip address, and more particularly asks the content handler 36 for action name maps for the selected sip address. If yes in step 52, the content handler 36 in step 54 provides the action name maps, softkey string(s), etc. to the native contact book application 30. The native contact book application 30 in turn parses the string and generates the softkey(s) (e.g., a "Chat" softkey for commanding and thereby initiating a chat session with the selected contact).

Referring to FIG. 6, the user may then select the softkey(s) generated by the mobile phone 20. As represented in step 56, an invocation object is thus generated and is sent by the native contact book application 30 to the content handler 36. The invocation object may include the sip address of the selected contact. The content handler 36 in turn forwards the invocation object to the registered Java client 38 as represented in step 58. As a result, the MIDlet within the Java application 38 associated with the command (e.g., softkey) receives the invocation object and takes the requested action. In the case where the softkey represents a "Chat" request, the MIDlet may initiate a chat session with the selected contact. In this manner, the user is able to initiate a chat session from within the native contact book application 30 as will be appreciated.

FIGS. 7A and 7B illustrate how the native contact book application 30 may be annotated with additional UI information in accordance with the present invention as described above in relation to FIGS. 3 and 4. FIG. 7A illustrates a conventional display produced by the native contact book application 30. FIG. 7B illustrates the same display incorporating the added UI information with respect to the various contacts.

FIGS. 7C and 7D illustrate how the native contact book application 30 is modified to include a "Chat" softkey in accordance with the present invention as described above in relation to FIGS. 5 and 6. Specifically, FIG. 7C illustrates how a "Chat" softkey 60 is added to the menu list provided on the mobile phone display 22. By selecting the "Chat" softkey 60, the registered Java client 38 in turn initiates a chat session with the particular contact as exemplified in FIG. 7D.

In view of the above, it will be appreciated that the present invention provides an electronic device architecture that enables a Java application to communicate to the native contact book application in a simple, straightforward manner.

The term "electronic device" as referred to herein includes portable radio communication devices. The term "portable radio communication device", also referred to herein as a "mobile radio device", includes all equipment such as mobile phones, pagers, communicators, e.g., electronic organizers, personal digital assistants (PDAs), smartphones or the like.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. An electronic device, comprising:
a controller programmed to include:
a native contact book application;
at least one Java application for providing one or more functions relating to information included in the native contact book application; and
a content handler serving as an interface between operations of the native contact book application and operations of the at least one Java application;
wherein the at least one Java application provides additional user interface information relating to corresponding contacts included in the native contact book application to the native contact book application via the content handler, the additional user interface information including presence information indicating whether a corresponding contact is online or offline and being displayed with the corresponding contacts in the native contact book application.

2. The electronic device of claim 1, wherein the content handler is a JSR-211 content handler.

3. The electronic device of claim 1, wherein the at least one Java application provides at least one command relating to contact information included in the native contact book application to the native contact book application via the content handler.

4. The electronic device of claim 3, wherein the at least one command calls a function carried out by the at least one Java application.

5. The electronic device of claim 4, wherein the at least one command serves to initiate a chat session with a contact identified in the native contact book application.

6. The electronic device of claim 5, wherein the chat session is initiated with the identified contact from within the native contact book application.

* * * * *